United States Patent
Maxwell (10) Patent No.: US 10,539,403 B2
(45) Date of Patent: Jan. 21, 2020

(54) LASER GUIDED BOMB WITH PROXIMITY SENSOR

(71) Applicant: Kaman Precision Products, Inc., Orlando, FL (US)

(72) Inventor: Barry A. Maxwell, Winter Garden, FL (US)

(73) Assignee: KAMAN PRECISION PRODUCTS, INC., Orlando, FL (US)

( * ) Notice: Subject to any disclaimer, the term of this patent is extended or adjusted under 35 U.S.C. 154(b) by 193 days.

(21) Appl. No.: 15/618,512

(22) Filed: Jun. 9, 2017

(65) Prior Publication Data

US 2018/0356188 A1 Dec. 13, 2018

(51) Int. Cl.
*F42B 10/64* (2006.01)
*F42C 13/04* (2006.01)
(Continued)

(52) U.S. Cl.
CPC .............. *F42B 10/64* (2013.01); *F41G 7/226* (2013.01); *F41G 7/2226* (2013.01);
(Continued)

(58) Field of Classification Search
CPC .......... F42B 10/64; F42B 12/58; F42C 13/04; F42C 13/00; F42C 19/02; F42C 13/042;
(Continued)

(56) References Cited

U.S. PATENT DOCUMENTS 3,152,547 A * 10/1964 Kyle ....................... F42C 13/04
 102/214
4,037,540 A * 7/1977 Keydel ................... F42C 13/00
 102/214
(Continued)

FOREIGN PATENT DOCUMENTS

GB 2221020 12/1990
GB 2448771 10/2008
(Continued)

OTHER PUBLICATIONS

Webpage on the BGL-400 at deagel.com; copyright years 2003-2017; accessed on Mar. 4, 2019; no author listed. (Year: 2017).*
(Continued)

*Primary Examiner* — Bernarr E Gregory
(74) *Attorney, Agent, or Firm* — Andrew D. Wright; Roberts Mlotkowski Safran Cole & Calderon, P.C.

(57) ABSTRACT

A proximity sensor for a Laser Guided Bomb (LGB) is provided. A proximity sensor for a Laser Guided Bomb (LGB) includes: an electronics package unit (EPU) configured to be connected to a front end of a warhead; and at least one sensor separate from the EPU and configured to be connected to a forward adapter that is connected to the front end of the warhead. The at least one sensor is configured to obtain data that is used to determine a height above ground of the LGB. The EPU is configured to compare the determined height above ground to a predefined value. The EPU is configured to generate a detonation signal for the warhead based on the determined height above ground being equal to or less than the predefined value.

12 Claims, 8 Drawing Sheets

(51) Int. Cl.
F42C 13/00 (2006.01)
F41G 7/22 (2006.01)
G01S 13/88 (2006.01)
F42B 10/00 (2006.01)

(52) U.S. Cl.
CPC ............ F41G 7/2293 (2013.01); F42C 13/00 (2013.01); F42C 13/04 (2013.01); G01S 13/882 (2013.01); G01S 13/883 (2013.01)

(58) Field of Classification Search
CPC ...... F41G 7/226; F41G 7/2226; F41G 7/2293; F41G 3/02; G01S 13/883; G01S 13/882; G01S 13/345; G01S 13/32
USPC ..................................... 102/211–214; 342/68
See application file for complete search history.

(56) References Cited

U.S. PATENT DOCUMENTS

| | | | | |
|---|---|---|---|---|
| 4,170,008 | A * | 10/1979 | Goebel | G01S 13/32 |
| | | | | 102/214 |
| 4,218,977 | A * | 8/1980 | Kalmus | F42C 13/04 |
| | | | | 102/214 |
| 4,651,647 | A | 3/1987 | Baker | |
| 4,660,040 | A * | 4/1987 | Grandos | G01S 13/345 |
| | | | | 342/128 |
| 4,773,328 | A * | 9/1988 | Germershausen | F42C 13/00 |
| | | | | 102/211 |
| 4,903,602 | A | 2/1990 | Skagerlund | |
| 4,991,508 | A | 2/1991 | Ziemba | |
| 4,991,509 | A | 2/1991 | Smith | |
| 5,218,164 | A * | 6/1993 | Magorian | F42C 13/042 |
| | | | | 102/214 |
| 5,325,784 | A * | 7/1994 | Bai | F42C 19/02 |
| | | | | 102/214 |
| 5,426,435 | A | 6/1995 | Moore et al. | |
| 6,044,765 | A | 4/2000 | Regebro | |
| 6,834,591 | B2 | 12/2004 | Rawcliffe et al. | |
| 6,919,840 | B2 | 7/2005 | Friedrich et al. | |
| 7,089,865 | B2 | 8/2006 | Regev | |
| 7,098,841 | B2 * | 8/2006 | Hager | F42C 13/04 |
| | | | | 102/206 |
| 7,121,210 | B2 * | 10/2006 | Steele | F42B 12/58 |
| | | | | 102/211 |
| 7,219,589 | B2 | 5/2007 | Gibson et al. | |
| 7,849,797 | B2 | 12/2010 | Geswender et al. | |
| 8,033,221 | B2 | 10/2011 | Edwards | |
| 8,117,955 | B2 | 2/2012 | Roemerman et al. | |
| 8,378,277 | B2 | 2/2013 | Sandomirsky et al. | |
| 8,433,460 | B1 | 4/2013 | Recchia et al. | |
| 8,541,724 | B2 | 9/2013 | Roemerman | |
| 8,757,064 | B2 | 6/2014 | Jennings et al. | |
| 8,997,652 | B2 | 4/2015 | Tepera et al. | |
| 2003/0127009 | A1* | 7/2003 | Oron | F41G 3/02 |
| | | | | 102/213 |
| 2005/0030219 | A1* | 2/2005 | Friedrich | F41G 7/226 |
| | | | | 342/68 |
| 2015/0285906 | A1 | 10/2015 | Hooper et al. | |
| 2016/0363426 | A1 | 12/2016 | Kerns et al. | |

FOREIGN PATENT DOCUMENTS

| | | |
|---|---|---|
| RU | 2534157 | 11/2014 |
| WO | 2015162062 | 10/2015 |

OTHER PUBLICATIONS

B. Glowacki, editor, "Aviation Ordnanceman: Nonresident Training Course"; publication NAVEDTRA14313; published by the Naval Education and Training Professional Development and Technology Center, Pensacola, Florida, USA; publication date and month: Jul. 2001. (Year: 2001).*
Hughes, "Lockheed Martin announces Paragon direct attack munition", http://www.janes.com/article/68476/lockheed-martin-announces-paragon-direct-attack-munition, Mar. 6, 2017; 3 pages.
GBU-12 Paveway II, WikiPedia, https://en.wikipedia.org/wiki/GBU-12_Paveway_II; accessed Jun. 9, 2017; 2 pages.
ATK, "ATK Delivers 100,000th DSU-33 Proximity Sensor to U.S. Air Force", http://www.defense-aerospace.com/articles-view/release/3/93204/atk-delivers-100%2C000th-dsu_33-proximity-sensor.html, Apr. 11, 2008; 5 pages.
Choi et al., "A Design and Assessment of a Direction Finding Proximity Fuze Sensor", http://ieeexplore.ieee.org/stamp/stamp.jsp?arnumber=6510437, IEEE Sensors Journal, vol. 13 Issue 8, 2013; 4 pages.
Richardson, "Fuzes go multi-role and smart", http://international.vlex.com/vid/fuzes-go-multi-role-and-smart-53047734, 2002, 2 pages.
"Weapon Fact Sheet 7: Paveway LASER Guided Bombs", 476th vFighter Group, 2013; 7 pages.
Attariwala, "Dumb Bombs with Graduate Degrees", https://armadainternational.com/2017/04/dumb-bombswithgraduatedegrees/, Apr. 27, 2017; 7 pages.
Federal Register, vol. 81 Issue 3, https://www.gpo.gov/fdsys/pkg/FR20160106/html/201533251.htm, Jan. 6, 2016; 3 pages.
Paveway II, Directory of U.S. Military Rockets and Missiles Appendix 5: Guided Bombs, http://www.designationsystems.net/dusrm/app5/paveway2.html, accessed May 23, 2017; 8 pages.
Paveway IV, WikiPedia, https://en.wikipedia.org/wiki/Paveway_IV, accessed Jun. 9, 2017; 4 pages.
Internation Search Report and Written Option of the International Searching Authority from PCT Application No. PCT/US18/36645 dated Feb. 6, 2019; 7 pages.
NavyBMR, Chapter 1, "Bombs, Fuzes and Associated Components", 2015, p. 2-12; 11 pages.
NavyBMR, Chapter 9, "Aircraft Ordinance", 2017, p. 1-7; 7 pages.
International Preliminary Report on Patentability, PCT/IPEA/416, PCT application No. PCT/US2018/036645, dated Oct. 1, 2019, 4 pages.

* cited by examiner

LASER GUIDED BOMB WITH PROXIMITY SENSOR

FIELD OF THE INVENTION

The present invention relates generally to air-dropped weapons and proximity (height of burst or target detection) sensors. More particularly, the present invention relates to systems and methods for enabling proximity detection on Laser Guided Bombs (LGBs) and novel placement of Radio Frequency (RF) or Electro-Optical (EO) sensors providing increased warhead performance.

BACKGROUND

Traditionally, LGBs are used to guide conventional general-purpose, multi-effect or penetrator warheads against point surface or sub-surface targets. The impact of the warhead with the target or ground initiates the fuze installed in the warhead, causing instantaneous or delayed detonation of the warhead depending on the fuze setting.

There are limitations with the traditional method of employing LGBs. While extremely effective against stationary point surface or sub-surface targets such as stationary vehicles, large ships, buildings, shelters or bunkers, it is less effective against fast moving vehicles, smaller, more maneuverable watercraft or area targets such as troops entrenched or in an open field. This is due, in part, to the degradation of accuracy of the weapon against moving targets combined with a significant portion of the blast and fragmentation of the warhead being absorbed by the ground at impact, effectively reducing the probability of disabling or destroying the intended target. This, then necessitates that the pilot or aircrew either reattack the target or to carry a mix of different weapons to address multiple types of targets. Neither situation is optimal in a theater of operations, where reducing exposure to hostile fire is vital to aircrew and aircraft survivability. Thus, it would be desirable to provide a system that enables the LGB to detonate the warhead prior to impact with the ground, in order to maximize the blast and fragmentation effects of the warhead against these types of targets without requiring modification of the guidance and control section hardware and/or software/firmware of the LGB itself.

No conventional system provides both laser guidance and airburst capability for a dumb-bomb, while also avoiding the use of complex Inertial Navigation System (INS) and Global Positioning System (GPS) guidance systems. For example, Paveway II is a conventional bolt-on kit for converting an unguided bomb (e.g., a dumb-bomb) to a LGB. While Paveway II provides laser guidance, it does not have airburst capability.

More specifically, Paveway II kits attach to a variety of warheads, and include a computer control group (CCG) containing a laser detector (e.g., a semi-active laser (SAL) seeker), a computer section containing guidance and control electronics, thermal battery, and a control actuation system (CAS). There are moveable front control canards and fixed rear wings for stability. The weapon guides on reflected laser energy: the seeker detects the reflected light ("sparkle") of the designating laser, and actuates the canards to guide the bomb toward the designated point. Paveway II uses only laser guidance for guiding the bomb, and does not utilize INS/GPS guidance. Paveway II also does not include a data interface to the launch platform. For example, since Paveway II does not utilize GPS, there is no need for Paveway II-equipped munitions to receive any position data, velocity vectors, and target coordinates from the aircraft.

Enhanced Paveway II and Paveway IV (later versions of Paveway) are dual mode INS/GPS and laser-guided bomb kits that are based on an Enhanced Computer Control Group (ECCG). The newer ECCG in Enhanced Paveway II and Paveway IV can contain a Height of Burst (HOB) sensor enabling air burst fuzing options, and a SAASM (Selective Availability Anti Spoofing Module) compliant GPS receiver. As such, Enanced Paveway II and Paveway IV provide both laser guidance and airburst capability, but with the drawback of increased cost and complexity due to the ECCG and INS/GPS guidance.

The Joint Direct Attack Munition (JDAM) is another conventional bolt-on guidance kit, that converts unguided munitions (i.e., dumb bombs) into guided munitions. By adding a tail section containing INS/GPS guidance to existing munitions, JDAM provides highly accurate delivery in any flyable weather. Guidance is provided by a JDAM through a tail control system and INS/GPS system. The INS, using updates from the GPS, guides the bomb to the target via the use of movable tail fins. The navigation system is initialized by transfer alignment from the aircraft that provides position and velocity vectors from the aircraft systems. Once released from the aircraft, the JDAM autonomously navigates to the designated target coordinates. Target coordinates can be loaded into the aircraft before takeoff, manually altered by the aircrew in flight prior to weapon release, or entered by a datalink from onboard targeting equipment.

A basic JDAM tail kit does not include laser guidance or airburst. However, these capabilities can be added to a JDAM with additional components. For example, a Laser JDAM (LJDAM) adds a laser seeker to the nose of a JDAM-equipped warhead, giving the ability to engage moving targets to the JDAM. The laser seeker is called Precision Laser Guidance Set (PLGS) and consists of the laser seeker itself, known as a DSU-38, installed on the nose of the warhead and a wire harness fixed under the warhead body to connect the DSU-38 with the JDAM tail kit. Another upgrade to the basic JDAM system is a DSU-33, which is a radar proximity sensor that provides a HOB fire pulse signal to the fuze for JDAM-equipped warheads. The DSU-33, like the DSU-38, is designed to be installed in the nose well of a warhead. As such, a JDAM-equipped warhead can only be equipped with one, but not both, of a DSU-33 and a DSU-38.

The DSU-38 is specifically designed to operate with the JDAM kit and is not compatible with a Paveway II kit. The DSU-33 can be used on a warhead without a Paveway II kit to provide airburst capability to an unguided bomb. However, the DSU-33 cannot be used on a warhead that is equipped with a Paveway II kit. This is because a DSU-33 and the guidance kit for Paveway II both occupy the same place on the warhead such that attaching one to a warhead means that you cannot attach the other to the same warhead.

SUMMARY

In a first aspect of the invention, there is a proximity sensor for a Laser Guided Bomb (LGB), comprising: an electronics package unit (EPU) configured to be connected to a front end of a warhead; and at least one sensor separate from the EPU and configured to be connected to a forward adapter that is connected to the front end of the warhead. The at least one sensor is configured to obtain data that is used to determine a height above ground of the LGB. The EPU is configured to compare the determined height above ground to a predefined value. The EPU is configured to generate a detonation signal for the warhead based on the determined height above ground being equal to or less than the predefined value.

In another aspect of the invention, there is a guidance kit for a Laser Guided Bomb (LGB), comprising: a forward adapter configured to connect to a retainer bolt at a front end of a warhead; a computer control group (CCG) configured to connect to the forward adapter, the CCG comprising a laser detector and a computer section configured to control moveable front control canards; and a proximity sensor comprising: at least one sensor on the forward adapter; and electronics package unit (EPU) configured to be inside the retainer bolt. The at least one sensor is configured to obtain data that is used to determine a height above ground of the LGB. The EPU is configured to compare the determined height above ground to a predefined value. The EPU is configured to generate a detonation signal for the warhead based on the determined height above ground being equal to or less than the predefined value.

In another aspect of the invention, there is a method of assembling a Laser Guided Bomb (LGB), comprising: connecting a retainer bolt to a front end of a warhead; connecting a forward adapter to the retainer bolt using a clamp ring; connecting first wiring from an electronics package unit (EPU) of a proximity sensor to an initiator in the warhead; connecting the EPU to the retainer bolt; and connecting second wiring from the EPU to at least one sensor element of the proximity sensor mounted on the forward adapter.

An embodiment of the present invention is directed to a proximity sensor for implementation on-board a LGB system guidance kit to warhead adapter, said proximity sensor including: a single or multiple transmitting/receiving antenna(s), the antenna(s) being conformal or non-conformal to the attachment location; an electronics assembly, the assembly being connected to the antenna(s) by cabling, and containing signal processing electronics (if not incorporated or directly connected to the antenna(s)), power supply and management, programming switches and associated electronics; and a cable that connects to the fuzing apparatus installed in the warhead in order to provide the detonation signal to the fuze. The programming switches can be internal to the adapter, e.g., on the electronics assembly, or can be external to the adapter, e.g., arranged at or on an outer surface of the adapter.

An additional embodiment of the present invention is directed to proximity sensor for implementation on-board a LGB system guidance kit to warhead adapter, said proximity sensor including: a single or multiple transmitting/receiving electro-optical (EO) device(s), the EO device(s) being conformal or non-conformal to the attachment location; an electronics assembly, the assembly being connected to the EO device(s) by cabling, and containing signal processing electronics (if not incorporated or directly connected to the EO device(s)), power supply and management, programming switches and associated electronics; and a cable that connects to the fuzing apparatus installed in the warhead in order to provide the detonation signal to the fuze.

An additional embodiment of the present invention is directed to a hybrid proximity sensor for implementation on-board a LGB system guidance kit to warhead adapter, said hybrid proximity sensor including: a single or multiple transmitting/receiving electro-optical (EO) device(s), the EO device(s) being conformal or non-conformal to the attachment location; a single or multiple transmitting/receiving antenna(s), the antenna(s) being conformal or non-conformal to the attachment location: an electronics assembly, the assembly being connected to the EO device(s) and antenna(s) by cabling, and containing signal processing electronics (if not incorporated or directly connected to the EO device(s) and/or antenna(s)), power supply and management, programming switches and associated electronics; and a cable that connects to the fuzing apparatus installed in the warhead in order to provide the detonation signal to the fuze.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The present invention relates generally to air-dropped weapons and proximity (height of burst or target detection) sensors. More particularly, the present invention relates to systems and methods for enabling proximity detection on Laser Guided Bombs (LGBs) and novel placement of Radio Frequency (RF) or Electro-Optical (EO) sensors providing increased warhead performance. In accordance with aspects of the invention, a proximity sensor is configured to provide airburst capability to a LGB. In a preferred embodiment, the proximity sensor is particularly configured for use with a Paveway II kit. In embodiments, the proximity sensor is independent of the laser guidance system of the LGB. In this manner, implementations of the invention provide airburst capability to a LGB without requiring the extra complexity (and cost) of a INS/GPS guidance system, and without requiring modification of an already existing laser guidance system.

As used herein, a Laser Guided Bomb (LGB) is a bomb that is equipped only with a laser guidance system and is not equipped with a INS/GPS guidance system, excluding Dual Mode Laser Guided Bombs (DMLGB). For example, a Paveway II equipped bomb would be considered a LGB because it is equipped only with the laser guidance system of the CCG and does not utilize INS/GPS guidance. Conversely, an enhanced Paveway II and a Paveway IV equipped bomb would not be considered a LGB because each is equipped with both laser guidance and a INS/GPS guidance system (each is a DMLGB). Similarly, a Laser JDAM (LJDAM) would not be considered a LGB because it is equipped with both laser guidance and a INS/GPS guidance system.

Figure 1:
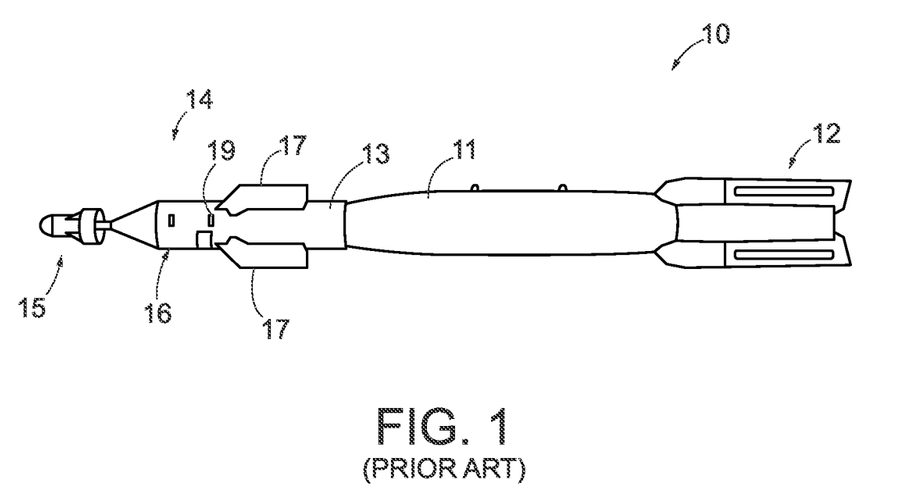
FIGS. 1 and 2 show a conventional laser guided bomb.
Figure 2:
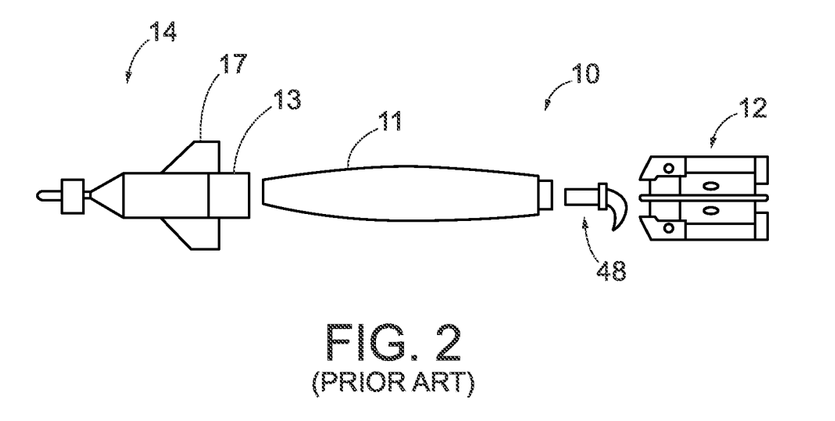

FIGS. 1 and 2 show a conventional LGB 10. As shown in FIGS. 1 and 2, the LGB 10 includes a warhead 11, a tail assembly 12, a forward adapter 13, and a CCG 14, e.g., similar to a Paveway II equipped bomb such as a GBU-12. The forward adapter 13 is used to mount the CCG 14 to nose of the warhead 11 and to provide an aerodynamic transition (e.g., a fairing) between the CCG 14 and the warhead 11, which may be of different diameters depending on warhead type and weight. There can be differently sized forward adapters 13 for differently sized warheads 11, however the function and implementation is the same for each and thus transparent to this invention.

Still referring to FIGS. 1 and 2, the CCG 14 includes a laser detector 15, a computer section 16, and a control actuation system (CAS) 19 for moving the moveable front control canards 17. The laser detector 15 detects reflected light of a designating laser. Based on the angle of incidence of the detected light, the computer section 16 causes the CAS to actuate (e.g., deflect) the front control canards 17 to guide the LGB 10 toward the designated point. Unlike the canards 17, the wings of the tail assembly 12 remain in a fixed position after being deployed and are not controlled by the computer section 16.

As seen in FIG. 1, the CCG 14 is attached to the forward portion (e.g., the front end) of the warhead 11 (via the forward adapter 13) in order to improve accuracy of the warhead using laser guidance after release of the LGB 10 from a launching platform such as an aircraft. The location of the CCG 14 poses a problem for integrating a HOB (e.g., airburst) system on the LGB 10 since HOB systems typically require hardware that also occupies or attaches to the forward portion of the warhead. However, by modifying the forward adapter of an LGB as described herein, HOB functionality can be provided to an LGB without requiring removal or modification of the laser guidance kit hardware.

Figure 3:
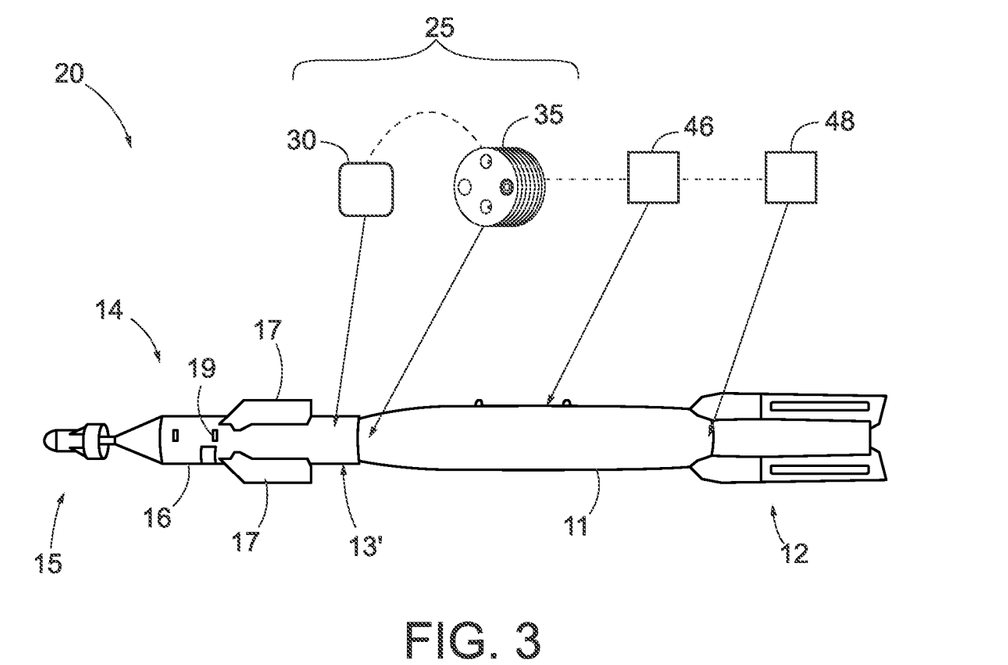
FIG. 3 shows a laser guided bomb in accordance with aspects of the invention.

FIG. 3 shows a LGB 20 in accordance with aspects of the invention, the LGB 20 including a warhead 11, a tail assembly 12, a forward adapter 13', and a CCG 14 similar to the LGB 10 of FIG. 1. In embodiments, the LGB 20 includes a proximity sensor 25 comprising at least one sensor 30 mounted on the forward adapter 13' and a sensor electronics package unit (EPU) 35 mounted at the nose of the warhead 11. According to aspects of the invention, the proximity sensor 25 is configured to determine a height above ground of the LGB 20, and to transmit a detonation signal (e.g., a fire pulse) to a fuze system when the determined height above ground equals or is less than a predefined value. Upon receiving the detonation signal from the proximity sensor 25, the fuze system detonates the warhead 11. In this manner, the proximity sensor 25 provides HOB (e.g., airburst) capability to the LGB 20.

The proximity sensor 25 may utilize any conventional or later developed technology that is configured to obtain data that is used to determine a height above ground of the LGB 20. For example, the at least one sensor 30 may comprise at least one Radio Frequency (RF) sensor, at least one Electro-Optical (EO) sensor, or a combination of at least one RF sensor and at least one EO sensor. In embodiments, the EPU 35 comprises electronics that receive data from the at least one sensor 30 and compare the data to a predefined value. The data may be unprocessed data, in which case the EPU 35 uses signal processing to determine a height above ground of the LGB 20 based on the unprocessed data. Alternatively, the at least one sensor 30 may perform the signal processing, such that the data received by the EPU 35 arrives in the form of the determined height above ground of the LGB 20. In either implementation, the EPU 35 is configured to compare the determined height above ground of the LGB 20 to a predefined value, and to transmit a fire pulse to the fuze system when the determined height above ground of the LGB 20 is less than or equal to the predefined value. The EPU 35 may comprise a computer memory for storing the predefined value and at least one of a computer processor, FPGA, and ASIC for comparing the determined height above ground to the predefined value.

In an exemplary embodiment, the proximity sensor 25 utilizes an RF radar altimeter to determine the height above ground of the LGB 20. For example, the at least one sensor 30 may comprise a plurality of RF antennas mounted at an exterior surface of the forward adapter 13' and wired to the EPU 35 as described in greater detail herein. The EPU 35 may include a signal generator and a signal processor that employ conventional radar techniques to generate signals that are transmitted by the RF antennas and to determine a height above ground of the LGB 20 based on reflected signals received by the RF antennas. Implementations of the invention are not limited to this example, and the proximity sensor 25 may utilize other techniques (e.g., Electro-Optical distance measuring techniques) to determine the height above ground of the LGB 20.

After the LGB 20 is launched from a platform (e.g., dropped from an aircraft), the height above ground of the LGB 20 constantly changes as the LGB 20 falls through the air. Accordingly, the proximity sensor 25 is configured to repeat the detecting (by the at least one sensor 30) and the comparing (by the EPU 35) until such a time as the determined height above ground of the LGB 20 is less than or equal to the predefined value. The proximity sensor 25 may be configured to repeat the detecting and the comparing at any desired interval, including but not limited to once per millisecond, to provide a desired accuracy of the HOB function.

In accordance with aspects of the invention, the proximity sensor 25 determines the height above ground of the LGB 20 independent of the laser guidance system of the CCG 14. For example, in determining the height above ground of the LGB 20, the proximity sensor 25 utilizes data obtained only by the at least one sensor 30, and does not utilize data from the laser detector 15 and/or the computer section 16. In this manner, the proximity sensor 25 operates independently of the CCG 14 and, thus, does not require modification of, or connection to, the CCG 14. In this manner, implementations may be used with a conventional Paveway II without requiring any modification of, or connection to, the CCG of the conventional Paveway II.

Figure 4:
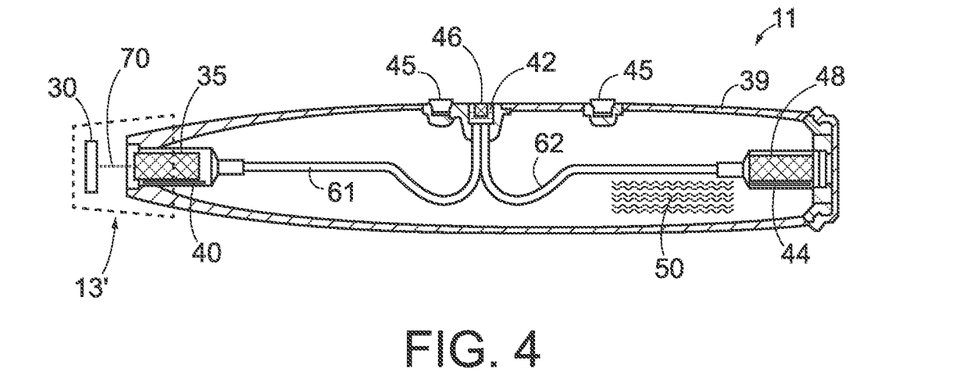
FIG. 4 shows an arrangement of components within a warhead in accordance with aspects of the invention.

FIG. 4 diagrammatically depicts an exemplary arrangement of elements of the system in the warhead 11 of the LGB 20 of FIG. 3. The warhead 11 may be a conventional warhead including but not limited to an Mk-82, Mk-83, or Mk-84. As shown in FIG. 4, the warhead 11 includes a body 39 that has a forward fuze well 40, a charging well 42, and an aft fuze well 44. Lugs 45 are provided on the exterior of the body 39 for connecting the warhead 11 to an aircraft in a conventional manner. An interior of the body 39 may include an amount of explosive material 50 that can be detonated by a fuze to cause the warhead 11 to explode.

In embodiments, the EPU 35 is mounted in or forward of the forward fuze well 40, an initiator 46 is mounted in the charging well 42, and a fuze 48 is mounted in the aft fuze well 44. The fuze system may comprise the initiator 46 and the fuze 48. In embodiments, the EPU 35 sends a detonation signal (e.g., a fire pulse) to the fuze 48 via the initiator 46. Upon receiving the fire pulse from the initiator 46, the fuze 48 detonates the explosive material 50 contained inside the body 39 of the warhead 11. The initiator 46 may comprise but is not limited to an FZU or Mk-122 switch. The fuze 48 may comprise but is not limited to an FMU-139 or an FMU-152 fuze.

As shown in FIG. 4, first cabling 61 (e.g., wiring inside a conduit) may be provided inside the body 39 to operatively connect the EPU 35 and the initiator 46, such that the EPU 35 can transmit the fire pulse to the initiator 46 via the first cabling 61. Second cabling 62 (e.g., wiring inside a conduit) may be provided inside the body 39 to operatively connect the initiator 46 and the fuze 48, such that the initiator 46 can transmit the fire pulse to the fuze 48 via the second cabling 62.

FIG. 4 also diagrammatically depicts the forward adapter 13' connected to the forward end of the warhead 11. In embodiments, the at least one sensor 30 mounted on the forward adapter 13' and is operatively connected to the EPU 35 by cabling 70 (e.g., wiring) as described herein. In a preferred embodiment, the forward adapter 13' is a Paveway II forward adapter that is modified with the at least one sensor 30 mounted thereon. Although not shown in FIG. 4, a CCG of a Paveway II may be connected to the forward adapter 13' and a Paveway II tail assembly 12 may be attached to the tail end of the warhead 11 (e.g., as depicted in FIG. 3).

Figure 5:
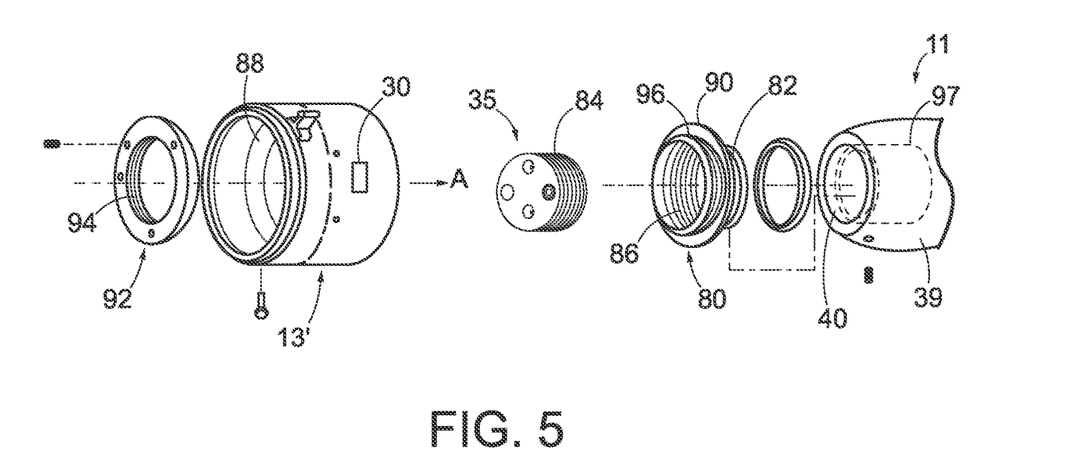
FIG. 5 depicts a system for mounting a proximity sensor to a warhead in accordance with aspects of the invention.

FIG. 5 depicts a system for mounting a proximity sensor to a warhead in accordance with aspects of the invention. As shown in FIG. 5, an aft end of a retainer bolt 80 has a threaded exterior surface 82 that is configured to be threadingly connected to a threaded interior surface of the forward fuze well 40 of the warhead 11. An o-ring may be provided between the retainer bolt 80 and the warhead 11, and a setscrew may be threaded through a bore in the body 39 of warhead 11 to urge against the threaded exterior surface 82 of the retainer bolt 80 to prevent the retainer bolt 80 from backing out of threaded connection with the warhead 11. In embodiments, the EPU 35 has a threaded exterior surface 84 that is configured to be threadingly connected to a threaded interior surface 86 of the retainer bolt 80. The forward adapter 13' is configured to be mounted on the retainer bolt 80 by moving the forward adapter 13' in the direction indicated by arrow "A" until an internal circular flange 88 of the forward adapter 13' abuts against an external circular flange 90 of the retainer bolt 80. With the forward adapter 13' thus mounted on the retainer bolt 80, a clamp ring 92 having an threaded interior surface 94 is threadingly connected to a threaded exterior surface 96 at the forward end of the retainer bolt 80. A setscrew may be threaded through a bore in the clamp ring 92 to urge against the internal circular flange 88 of the forward adapter 13' to prevent the retainer clamp ring 92 from backing out of threaded connection with the retainer bolt 80. When the LGB 20 is assembled in this manner, the EPU 35 is secured to the front end of the warhead 11 and covered by the forward adapter 13'.

In the embodiment shown in FIG. 5, the EPU 35 does not extend into the forward fuze well 40. Accordingly, a support cup 97 or other structural device may be placed in the forward fuze well 40, e.g., for strengthening the LGB 20 for penetrating hardened targets. The support cup 97 may comprise, for example, a steel cylinder having a wall thickness in a range of ¼ inch to ½ inch, for example.

Figure 6:
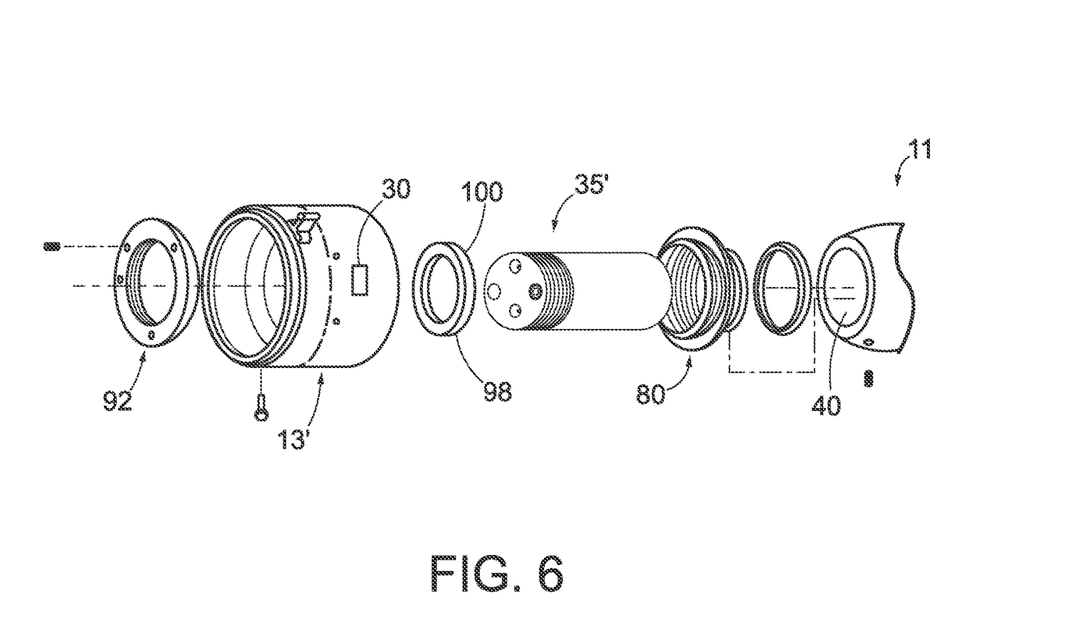
FIG. 6 depicts another system for mounting a proximity sensor to a warhead in accordance with aspects of the invention.

FIG. 6 depicts another system for mounting a proximity sensor to a warhead in accordance with aspects of the invention. The arrangement shown in FIG. 6 includes the same forward adapter 13', retainer bolt 80, and clamp ring 92 as described with respect to FIG. 5. The retaining bolt 80 is mounted to the warhead 11 in the same manner as described with respect to FIG. 5. The EPU 35' is inserted through the retainer bolt 80 and partially into the forward fuze well 40 of the warhead 11. A fuze retaining nut 98 with a threaded exterior surface 100 is configured to be threadingly connected to the threaded interior surface 86 of the retaining bolt 80 to hold the EPU 35' in place relative to the retaining bolt 80 (i.e., in the forward fuze well 40). After connecting the fuze retaining nut 98, the forward adapter 13' and the clamp ring 92 are connected in the same manner as described with respect to FIG. 5. In the embodiment shown in FIG. 6, the EPU 35' is longer than the EPU 35 of FIG. 5 such that the EPU 35' extends at least partially into the forward fuze well 40 of the warhead 11. In embodiments, the EPU 35' may be constructed of material of sufficient strength and thickness to approximate a conventional support cup that is used for strengthening a bomb for penetrating hardened targets. For example, the EPU 35' may have an outer cylindrical wall 102 that is composed of steel having a thickness in a range of ¼ inch to ½ inch.

Although not shown in FIGS. 5 and 6, it is to be understood that during installation of the EPU 35 (or EPU 35'), wiring may be connected between the EPU 35 (or EPU 35') and the initiator 46 via the first cabling 61 as shown in FIG. 4. Also during installation of the EPU 35 (or EPU 35'), wiring may be connected between the EPU 35 (or EPU 35') and the at least one sensor element 30 via the cabling 70 as shown in FIG. 4.

Figure 7A:
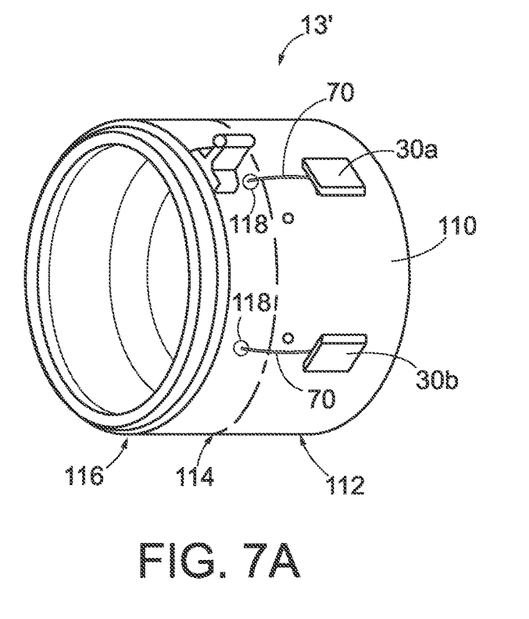
FIGS. 7A and 7B show mountings of sensors on a forward adapter in accordance with aspects of the invention.
Figure 7B:
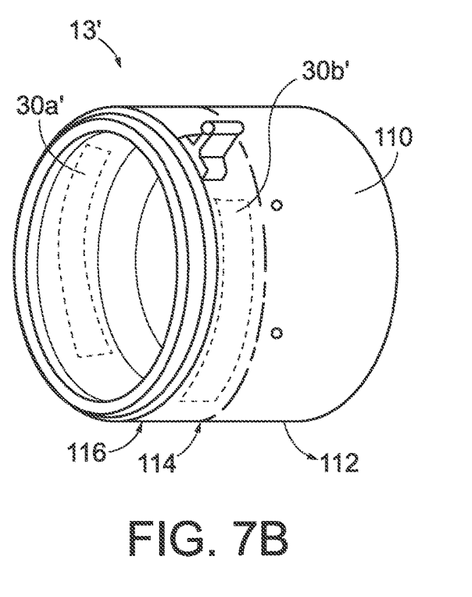

FIGS. 7A and 7B show mountings of sensors on a forward adapter in accordance with aspects of the invention. In an exemplary embodiment depicted in FIG. 7A, the at least one sensor 30 of the proximity sensor 25 includes at least two antennas 30a and 30b mounted on an outer surface 110 of the forward adapter 13'. The antennas 30a and 30b may be, for example, patch antennas that are connected to the outer surface 110 by any suitable technique including but not limited to adhesive, mechanical fastener (e.g., screw, nut and bolt, rivet, etc.), or a combination of adhesive and mechanical fastener. In a preferred embodiment the antennas 30a and 30b are RF patch antennas that form part of an RF radar altimeter of the proximity sensor 25.

In the embodiment shown in FIG. 7A, the antennas 30a and 30b are mounted on a shroud portion 112 of the forward adapter 13' which is aft of a dividing line 114 that delineates a structural portion 116 and the shroud portion 112. However, the antennas 30a and 30b are not limited to mounting on the shroud portion 112 and instead may be mounted at any desired location(s) on the outer surface 110 of the forward adapter 13'. Any desired number 'n' of antennas 30a-n may be mounted on the outer surface 110 of the forward adapter 13'.

Still referring to FIG. 7A, the antennas 30a and 30b may be operatively connected to the EPU 35 (not shown) by cabling 70 (e.g., electrical wiring). A portion of the cabling 70 may extend along the outer surface 110 of the forward adapter 13', pass through a bore 118 in the outer surface 110 of the forward adapter 13', and extend from the bore 118 to the EPU 35. Alternatively, the cabling 70 may extend from the antennas 30a and 30b directly through a bore 118 in the outer surface 110 of the forward adapter 13' without extending along the outer surface 110 of the forward adapter 13' (e.g., as depicted in FIG. 8B). In a preferred embodiment, the antennas 30a and 30b are mounted on the shroud portion 112 of the forward adapter 13' and the bore 118 is in the structural portion 116 of the forward adapter 13', with the cabling 70 running along the outer surface 110 of the forward adapter 13' from the antennas 30a and 30b to respective bores 118. In this manner, the structural modification of the forward adapter 13' (e.g., the bores 118) is made at the structural portion 116.

In an exemplary embodiment depicted in FIG. 7B, the at least one sensor 30 of the proximity sensor 25 includes at least two conformal antennas 30a' and 30b' mounted on the outer surface 110 of the forward adapter 13'. The conformal antennas 30a' and 30b' may be connected to the outer surface 110 by any suitable technique including but not limited to adhesive, mechanical fastener (e.g., screw, nut and bolt, rivet, etc.), or a combination of adhesive and mechanical fastener. In a preferred embodiment the conformal antennas 30a' and 30b' are RF antennas that form part of an RF radar altimeter of the proximity sensor 25.

In the embodiment shown in FIG. 7B, the conformal antennas 30a' and 30b' are mounted on the structural portion 116 of the forward adapter 13' which is forward of the dividing line 114 that delineates the structural portion 116 and the shroud portion 112. However, the conformal antennas 30a and 30b are not limited to mounting on the structural portion 116 and instead may be mounted at any desired location(s) on the outer surface 110 of the forward adapter 13'. Any desired number 'n' of conformal antennas 30a'-n' may be mounted on the outer surface 110 of the forward adapter 13'.

Similar to the embodiment described with respect to FIG. 7A, the conformal antennas 30a' and 30b' may be connected to the EPU 35 via cabling 70. The cabling may extend along the outer surface 110 of the forward adapter 13', pass through a bore in the outer surface 110 of the forward adapter 13', and extend from the bore to the EPU 35. Alternatively, the cabling 70 may extend from the conformal antennas 30a' and 30b' directly through a bore in the outer surface 110 of the forward adapter 13' without extending along the outer surface 110 of the forward adapter 13' (e.g., as depicted in FIG. 8B).

Figure 8A:
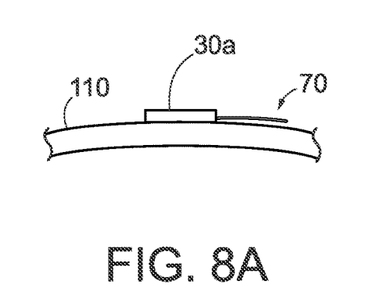
FIGS. 8A, 8B, 8C, 8D, and 8E show arrangements for mounting sensors on a forward adapter in accordance with aspects of the invention.
Figure 8B:
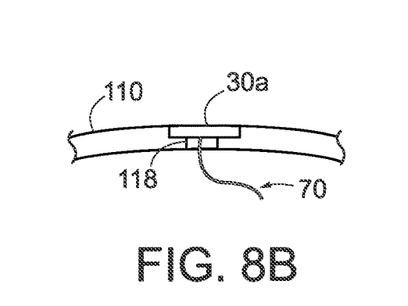
Figures 8C, 8D, 8E:
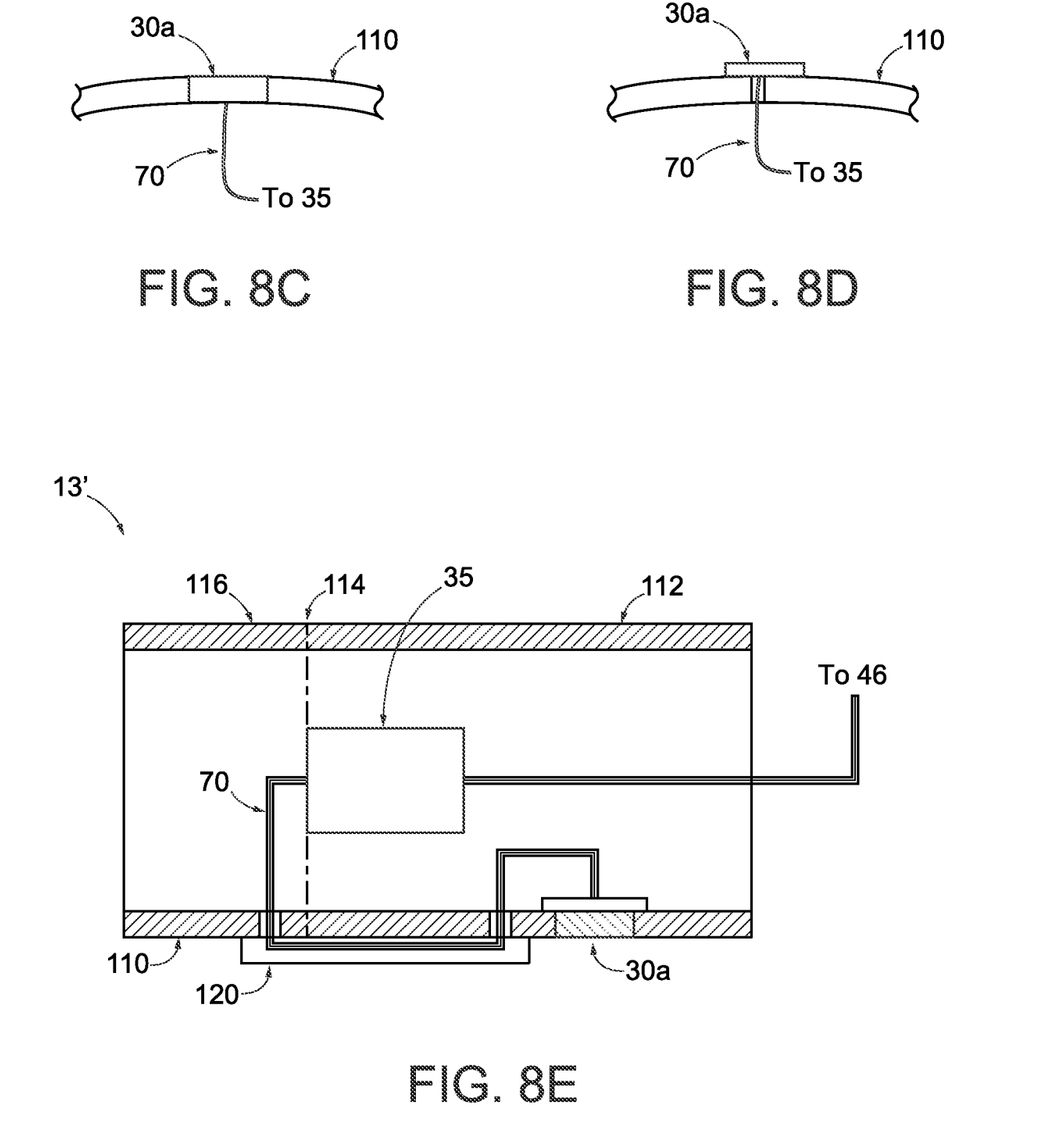

FIGS. 8A, 8B, 8C, and 8D show arrangements for mounting sensors on a forward adapter in accordance with aspects of the invention. FIG. 8A illustrates an arrangement in which an antenna (e.g., antenna 30a) is mounted on the outer surface 110 of the forward adapter 13' such that the antenna protrudes outward from the outer surface 110. FIG. 8B illustrates an arrangement in which an antenna (e.g., antenna 30a) is mounted in a recessed portion of the outer surface 110 of the forward adapter 13' such that the outer surface of the antenna is flush with the outer surface 110. FIG. 8B also illustrates the cabling 70 extending directly from the antenna 30a through the bore 118 without extending along the outer surface 110. FIG. 8C illustrates an arrangement in which an antenna (e.g., 30a) is mounted in a through-hole in the forward adapter 13' such that an outer surface of the antenna is flush with the outer surface 110. FIG. 8D illustrates an arrangement in which an antenna (e.g., 30a) is mounted on the outer surface 110 of the forward adapter 13' such that the antenna protrudes outward from the outer surface 110, with the cabling 70 extending directly from the antenna 30a through the bore 118 without extending along the outer surface 110. In the manner shown in FIGS. 8A-8D, at least one sensor (e.g., 30a) is configured to be at an outer surface of the forward adapter 13'. The mounting arrangements shown in FIGS. 8A-8D can be used with the implementation shown in FIG. 7A or the implementation shown in FIG. 7B. As used herein, flush carries the meaning of the term that would be understood by those of skill in the art and may include reasonable tolerances that are understood by those of skill in the art.

FIG. 8E shows an exemplary embodiment of an antenna and cabling arrangement in accordance with aspects of the invention. FIG. 8E diagrammatically shows a cross section of the forward adapter 13' with the EPU 35, and omits other elements (such as the retainer ring) for clarity. As shown in FIG. 8E, the antenna 30a is mounted through a through-hole in the shroud portion 112 of the forward adapter 13', such that the outer surface of the antenna 30a is flush with the outer surface 110 of the shroud portion 112 of the forward adapter 13'. The cabling 70 that connects the antenna 30a to the EPU 35 extends from the antenna 30a to an interior of the shroud portion 112, through a bore in the shroud portion 112, along the outer surface 110 from a location at the shroud portion 112 to a location at the structural portion 116, through a bore in the structural portion 116, and in the interior of the structural portion to the EPU 35. A cover 120 may be arranged on the outer surface 110 of the forward adapter 13' to cover the portion of the cabling 70 that runs along the outer surface 110. Although a single antenna 30a is shown, it is understood that any suitable number of antennas may be used, including but not limited to four antennas evenly spaced around the circumference of the forward adapter 13'.

Although FIGS. 7A-7B and 8A-8E are described with respect to RF antennas, implementations of the invention are not limited to RF sensors and instead may employ other types of sensors. For example, the elements 30a and 30b (or 30a' and 30b') may alternatively represent EO sensors or a combination of RF and EO sensors.

Figure 9:
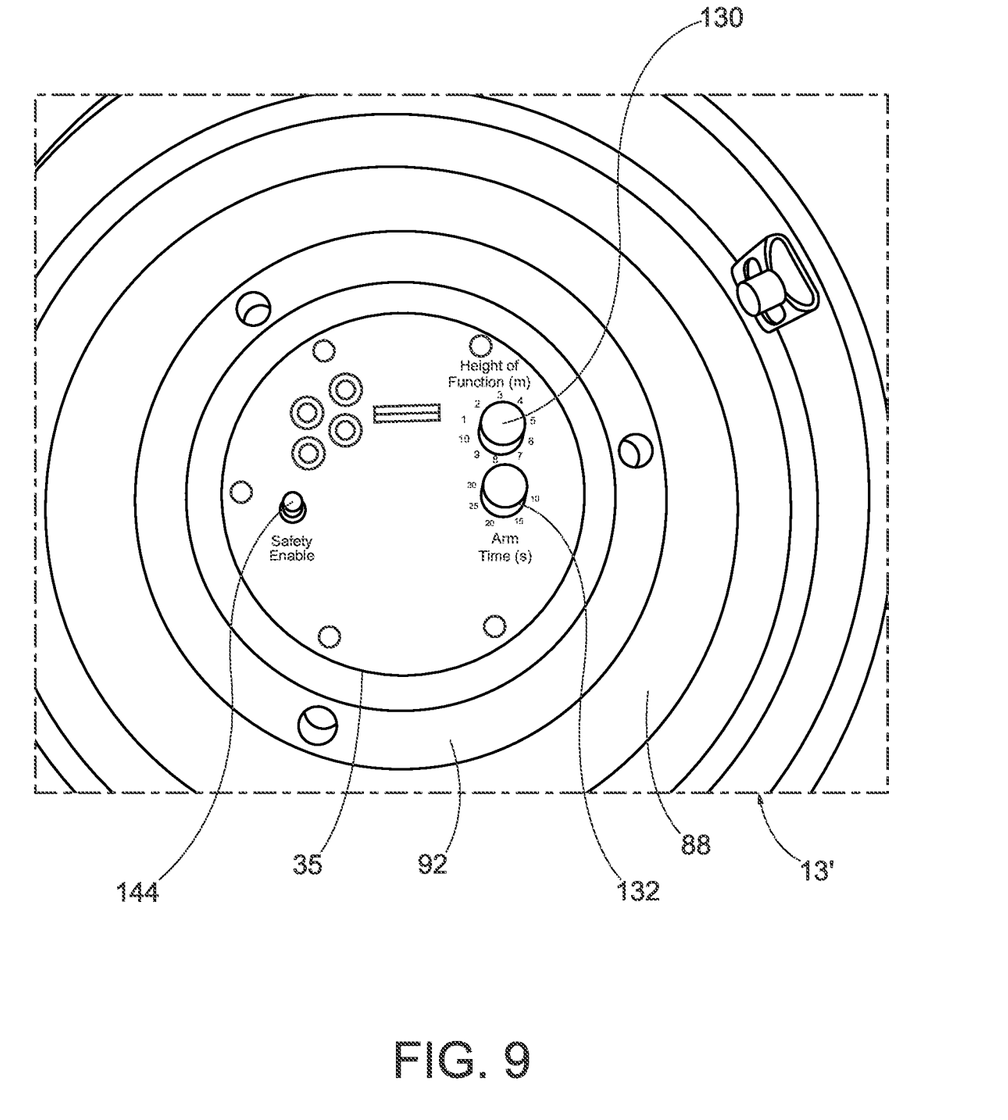
FIG. 9 shows an implementation of a proximity sensor in accordance with aspects of the invention.
Figure 10:
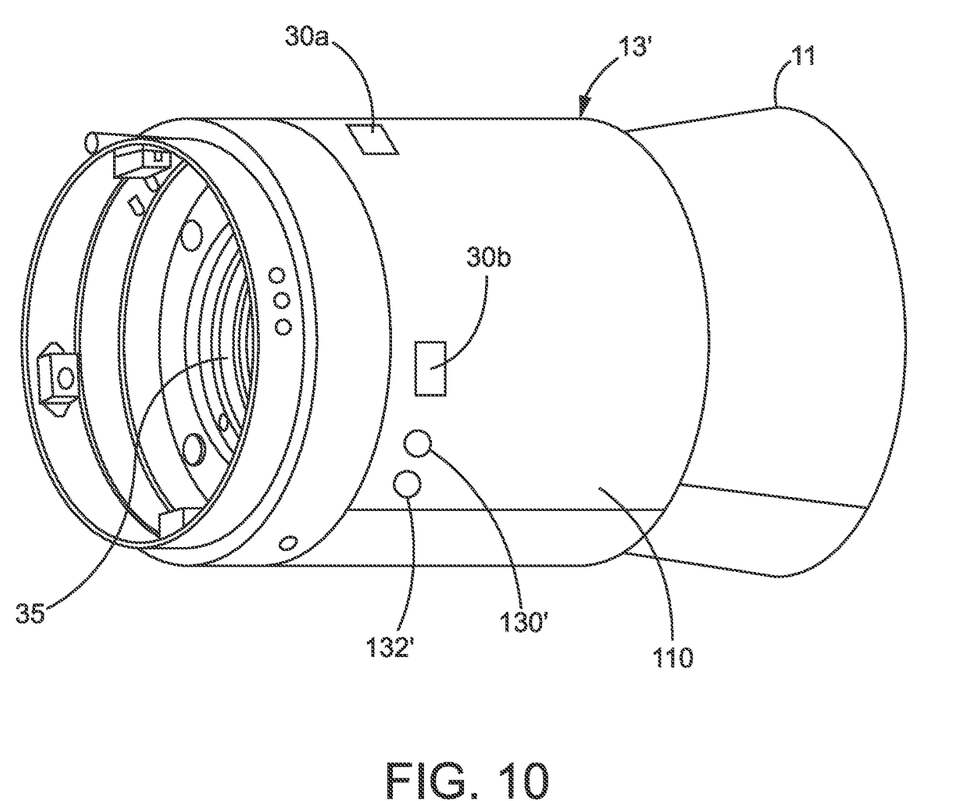
FIG. 10 shows another implementation of a proximity sensor in accordance with aspects of the invention.

FIGS. 9 and 10 show implementations of a proximity sensor in accordance with aspects of the invention. In embodiments, the proximity sensor 25 is configured to permit manual adjustment of at least one of airburst height and arming time. In a first embodiment, shown in FIG. 9, the EPU 35 includes a height switch 130 that permits manual adjustment of HOB (airburst) height and an arm time switch 132 that permits manual adjustment of arming time of the proximity sensor 25.

The height switch 130 may be any type of switch that permits manual adjustment by a human user to select one value from a plurality of predefined values for an airburst height for the LGB 20. In the embodiment shown in FIG. 9, the height switch 130 is a dial that has ten predefined locations corresponding to ten respective airburst heights (e.g., 1, 2, 3, 4, 5, 6, 7, 8, 9, 10 meters). A user may manually adjust the airburst height of the LGB 20 by turning the dial to one of the ten predefined locations.

In accordance with aspects of the invention, the EPU 35 comprises electronics that detect the airburst height selected by a user via the height switch 130 and that use this selected airburst height as the predefined value that is compared against the determined height above ground of the LGB 20. For example, if the user adjusts the height switch 130 to a setting of 10 meters, then the EPU 35 sends the detonation signal (e.g., a fire pulse) to the fuze 48 via the initiator 46 when the EPU 35 determines that the determined height above ground of the LGB 20 equals or is less than 10 meters. In this manner, the height switch 130 is used to selectively set an above ground altitude at which the warhead will detonate, such that the proximity sensor 25 provides an adjustable HOB function to the LGB 20.

The height switch 130 is not limited to the number of predefined locations shown in FIG. 9 (e.g., ten predefined locations). Instead, the height switch 130 may have any number of predefined locations greater than one. Moreover, the proximity sensor 25 is not limited to the height values shown in FIG. 9 (e.g., 1, 2, 3, 4, 5, 6, 7, 8, 9, 10 meters). Instead, the EPU 35 may be programmed with any desired heights for the respective predefined locations of the height switch 130. As but one alternate example, the height switch 130 may have six predefined locations with respective height values of 10, 15, 20, 25, 30, 35 feet. Other configurations may be used within the scope of the invention. The height switch 130 is not limited to a single switch. Instead, plural switches may be configured to provide an operator that ability to selectively set an above ground altitude at which the warhead will detonate. For example, the height switch 130 may comprise two switches: a first switch configured to set a tens of feet value, with predefined values including integers from zero to nine; and a second switch configured to set a ones of feet value, with predefined values including integers from zero to nine. In this manner, the two switches may be used to set a value from one to 99 feet in increments of one foot.

Still referring to FIG. 9, the arm time switch 132 is a switch that permits manual adjustment of arming time of the proximity sensor 25. In embodiments, the arming time is a time that the proximity sensor 25 waits before 'turning on' after the LGB 20 has detached from the airplane (e.g., a time that the proximity sensor waits before beginning the processes of determining the height above ground of the LGB 20 and comparing of the determined height above ground to the predefined value). The arm time switch 132 may be any type of switch that permits manual adjustment by a human user to select one value from a plurality of predefined values for the arming time of the proximity sensor 25. In the embodiment shown in FIG. 9, the arm time switch 132 is a dial that has five predefined locations corresponding to five respective arming times (e.g., 10, 15, 20, 25, 30 seconds). A user may manually adjust the arming time of the proximity sensor 25 by turning the dial to one of the five predefined locations.

The arming time is a wait time that is triggered by the LGB 20 being launched (e.g., detaching) from the airplane. In embodiments, the initiator 46 selectively provides an enable signal (e.g., a voltage) to the EPU 35 based on the LGB 20 detaching from the airplane. For example, the initiator 46 may comprise, or be configured similar to, a conventional FZU or Mk-122 that begins generating a voltage essentially instantaneously after detaching from the airplane. A conventional initiator provides this voltage to the fuze to arm the fuze. In aspects of the invention, the initiator 46 supplies this voltage to both the fuze 48 and the EPU 35 (e.g., via the cabling 61 and 62 shown in FIG. 4). In embodiments, the EPU 35 is configured to 'turn on' a predefined amount of time after receiving this voltage from the initiator 46. In embodiments, the EPU 35 comprises electronics that detect the arming time selected via the arm time switch 132, and the EPU 35 uses the selected arming time as the predefined amount of time to wait before 'turning on' after receiving the voltage from the initiator 46. For example, if the arm time switch 132 is set to the 20 seconds position, then the EPU 35 will 'turn on' 20 seconds after receiving the voltage from the initiator 46 (which is essentially 20 seconds after the LGB 20 detaches from the airplane). In this manner, implementations of the invention provide for manual adjustment of an arming time of the proximity sensor 25

The arm time switch 132 is not limited to the number of predefined locations shown in FIG. 9 (e.g., five predefined locations). Instead, the arm time switch 132 may have any number of predefined locations greater than one. Moreover, the proximity sensor 25 is not limited to the arming time values shown in FIG. 9 (e.g., 10, 15, 20, 25, 30 seconds). Instead, the EPU 35 may be programmed with any desired arming times for the respective predefined locations of the arm time switch 132.

FIG. 10 shows another implementation of a proximity sensor in accordance with aspects of the invention. In the exemplary implementation shown in FIG. 9, the height switch 130 and the arm time switch 132 are arranged on the EPU 35, e.g., on a front face of the EPU 35. In the exemplary implementation shown in FIG. 10, the height switch 130' and the arm time switch 132' are arranged remote from the EPU 35, e.g., on the outer surface 110 of the forward adapter 13'. In embodiments, the height switch 130' and the arm time switch 132' are configured to operate in the same manner and to provide the same functionality as the height switch 130 and the arm time switch 132 as described with respect to FIG. 9. The height switch 130' and the arm time switch 132' may be wired to the EPU 35, e.g., in a manner similar to how the antennas 30a and 30b are wired to the EPU 35. Mounting the height switch 130' and the arm time switch 132' on the outer surface 110 of the forward adapter 13' advantageously permits a user to inspect and/or adjust one or both of the switches after the LGB 20 is fully assembled, e.g., after the forward control kit 14 is connected to the forward adapter 13'. In this manner, implementations of the invention provide a mechanism for manual adjustment of at least one of the airburst height and the arming time of the LGB 20 after the LGB 20 is fully assembled.

Figure 11A:
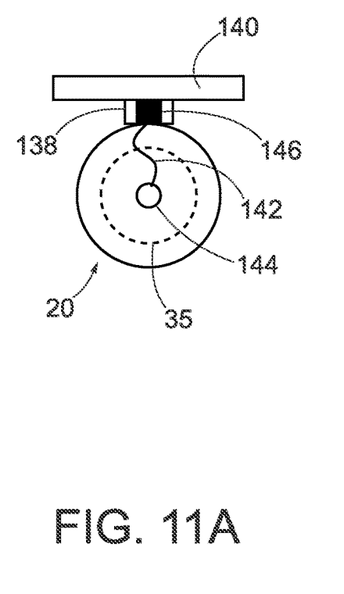
FIGS. 11A, 11B, and 11C show aspects of a proximity sensor in accordance with aspects of the invention.
Figure 11B:
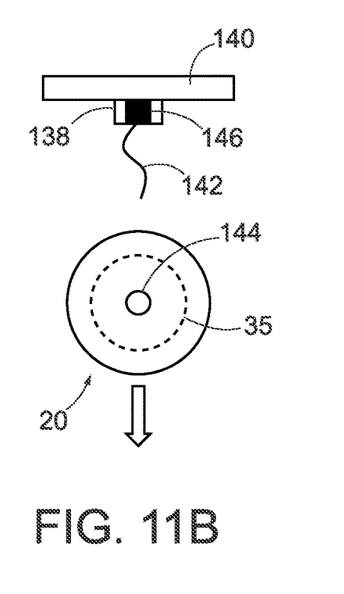
Figure 11C:
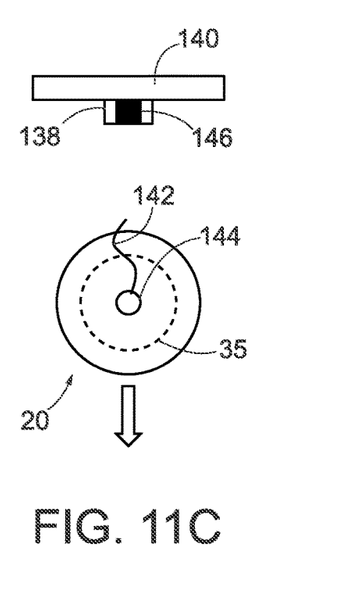

In embodiments, the EPU 35 comprises a safety enable switch that permits selectively enabling and disabling the proximity sensor. FIGS. 11A-C illustrate aspects of an ON/OFF control of the proximity sensor 25 using the safety enable switch in accordance with aspects of the invention. FIG. 11A diagrammatically depicts the LGB 20 attached to a rack 138 on an airplane 140. FIGS. 11B and 11C diagrammatically depict the LGB 20 falling away from the rack 138 after detaching from the rack 138. For clarity, only the EPU 35 is shown in FIGS. 11A-C, but it is understood that the LGB 20 depicted in FIGS. 11A-C is a fully assembled LGB 20 such as that shown in FIG. 3.

As shown in FIG. 11A, the LGB 20 is attached to the rack 138 prior to being launched (e.g., dropped). The rack 138 may comprise any suitable rack including but not limited to a BRU-32 ejector rack. In embodiments, a lanyard 142 has a first end connected to the rack 138 and a second end connected to a safety enable switch 144 of the EPU 35 of the LGB 20. The first end of the lanyard 142 is connected to a portion of the rack 138 that is configured to selectively retain or release the first end of the lanyard 142. For example, the first end of the lanyard 142 may be attached to a zero retention force (ZRF) solenoid switch 146 included in the rack 138. FIG. 11B depicts the situation in which the solenoid switch 146 retains the lanyard 142 when the LGB 20 is launched, and FIG. 11C depicts the situation in which the solenoid switch 146 releases the lanyard 142 when the LGB 20 is launched.

In accordance with aspects of the invention, the safety enable switch 144 has a default state of OFF, and is configured to be switched ON by the lanyard 142 exerting a force on the safety enable switch 144 when the LGB 20 drops from the rack 138 as depicted in FIG. 11B. Stated differently, when the LGB 20 drops from the rack 138 and the lanyard 142 is retained by the rack 138, the lanyard 142 pulls against the safety enable switch 144 and throws the safety enable switch 144 to the ON position. Conversely, when the LGB 20 drops from the rack 138 and the lanyard 142 is released by the rack 138 (e.g., as depicted in FIG. 11C), the safety enable switch 144 remains in the OFF position because the lanyard 142 does not exert sufficient force on the safety enable switch 144 to throw the switch.

In embodiments, the EPU 35 is configured such that the proximity sensor 25 only 'turns on' when two conditions are satisfied: (i) the EPU 35 receives the enable signal from the initiator 46 (as described with respect to FIG. 9) and (ii) the safety enable switch 144 is ON. If both conditions are satisfied and an arming time has been selected using the arm time switch 132, then the EPU 35 will turn on after receiving the enable signal from the initiator 46 and waiting the amount of time set by the arm time switch 132. Conversely, when the safety enable switch 144 is OFF, the proximity sensor 25 will not turn ON despite receiving the enable signal from the initiator 46. The LGB 20 does not have HOB (airburst) capability when the proximity sensor 25 is OFF. As such, controlling the solenoid switch 146 to retain or release the lanyard 142 can be used to cause the HOB capability of the launched LGB 20 to be ON or OFF. In embodiments, the solenoid switch 146 may be controlled using conventional techniques, e.g., based on crewmember input at the cockpit of the airplane. In this manner, an ON/OFF state of the HOB functionality of the LGB 20 may be selectively controlled by a crewmember in flight, even though the LGB 20 does not have an electronic data/communications interface with the airplane 140.

According to aspects of the invention, the combination of the controllable ON/OFF state provided by the safety enable switch 144, the airburst height provided by the height switch 130, and a programmable delay of the fuze 48 provides the ability for the aircrew to change the LGB 20 from an airburst bomb to a delayed detonation (e.g., penetrating) bomb in flight, and without utilizing an electronic data/communications interface between the airplane 140 and the LGB 20.

An exemplary use case illustrates this functionality. In this example, the fuze 48 is programmed with a delay of 25 milliseconds, such that the fuze 48 is configured to detonate the warhead at a time of 25 milliseconds after either (i) the fuze 48 receiving the fire pulse from the initiator 46 or (ii) the fuze 48 detecting impact (e.g., with the ground). In this example, the proximity sensor 25 is programmed with an airburst height greater than a distance the LGB 20 is expected to travel during the fuze delay. In this example, a human operator manipulates the height switch 130 to select an airburst height of 35 ft. Accordingly, if the proximity sensor 25 is turned ON when the LGB 20 is launched (e.g., as described using the lanyard 142 and safety enable switch 144), then the proximity sensor 25 will generate the a detonation signal when the LGB 20 is 35 ft above ground. The fuze 48 will receive the detonation signal and wait a time of 25 milliseconds and then initiate detonation of the warhead. An LGB 20 typically travels at a terminal velocity of about 1000 feet/second (or 1 foot/millisecond). As such, the LGB 20 travels about 25 feet during the 25 millisecond fuze delay and then explodes at an altitude of 10 feet (i.e., 35 feet minus 25 feet) above ground, thus acting as an airburst bomb. Conversely, if the proximity sensor 25 is turned OFF when the LGB 20 is launched (e.g., as described using the lanyard 142 and safety enable switch 144), then the proximity sensor 25 will not generate a detonation signal at all (even though the height switch 130 is set to 35 feet). In this situation, the LGB 20 falls until impact (e.g., with the ground) and the fuze 48 detonates the warhead 25 milliseconds after the impact, thus acting as a delayed detonation/penetrating bomb. In this manner, the safety enable switch 144 can be used in flight to control the LGB 20 to be either an airburst bomb or a delayed detonation/penetrating bomb.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A proximity sensor for a Laser Guided Bomb (LGB), comprising:
   an electronics package unit (EPU) configured to be connected to a front end of a warhead; and
   at least one sensor separate from the EPU and configured to be connected to a forward adapter that is connected to the front end of the warhead;
   wherein the at least one sensor is configured to obtain data that is used to determine a height above ground of the LGB;
   the EPU is configured to compare the determined height above ground to a predefined value; and
   the EPU is configured to generate a detonation signal for the warhead based on the determined height above ground being equal to or less than the predefined value;
   the at least one sensor is configured to be at an outer surface of the forward adapter; and
   further comprising cabling that operatively connects the at least one sensor to the EPU, wherein the cabling extends along the outer surface of the forward adapter.

2. The proximity sensor of claim 1, wherein the EPU comprises a cylindrical package configured to fit inside a retainer bolt that is connected to the front end of the warhead.

3. The proximity sensor of claim 2, wherein the EPU comprises a threaded exterior surface that is configured to be threadingly connected to a threaded interior surface of the retainer bolt.

4. The proximity sensor of claim 1, wherein the cabling extends through a bore in the forward adapter.

5. The proximity sensor of claim 4, wherein the at least one sensor is configured to be on a shroud portion of the forward adapter and the bore is in a structural portion of the forward adapter.

6. The proximity sensor of claim 1, wherein the proximity sensor comprises:
 a height switch that permits manual adjustment of the predefined value; and
 an arm time switch that permits manual adjustment of arming time.

7. The proximity sensor of claim 6, wherein the height switch and the arm time switch are on the EPU.

8. The proximity sensor of claim 1, wherein the EPU comprises a safety enable switch that permits selectively enabling and disabling the proximity sensor.

9. The proximity sensor of claim 1, wherein the forward adapter is a Paveway II forward adapter that is configured to be connected to a Paveway II forward guidance kit.

10. A proximity sensor for a Laser Guided Bomb (LGB), comprising:
 an electronics package unit (EPU) configured to be connected to a front end of a warhead; and
 at least one sensor separate from the EPU and configured to be connected to a forward adapter that is connected to the front end of the warhead;
 wherein the at least one sensor is configured to obtain data that is used to determine a height above ground of the LGB;
 the EPU is configured to compare the determined height above ground to a predefined value;
 the EPU is configured to generate a detonation signal for the warhead based on the determined height above ground being equal to or less than the predefined value;
 the proximity sensor comprises: a height switch that permits manual adjustment of the predefined value; and an arm time switch that permits manual adjustment of arming time; and
 the height switch and the arm time switch are configured to be mounted on an external surface of the forward adapter and connected to the EPU by wiring.

11. A guidance kit for a Laser Guided Bomb (LGB), comprising:
 a forward adapter configured to connect to a retainer bolt at a front end of a warhead;
 a computer control group (CCG) configured to connect to the forward adapter, the CCG comprising a laser detector and a computer section configured to control moveable front control canards; and
 a proximity sensor comprising: at least one sensor on the forward adapter; and an electronics package unit (EPU) configured to be inside the retainer bolt;
 wherein the at least one sensor is configured to obtain data that is used to determine a height above ground of the LGB;
 the EPU is configured to compare the determined height above ground to a predefined value;
 the EPU is configured to generate a detonation signal for the warhead based on the determined height above ground being equal to or less than the predefined value;
 the proximity sensor comprises: a height switch that permits manual adjustment of the predefined value; and an arm time switch that permits manual adjustment of arming time; and
 the height switch and the arm time switch are on an external surface of the forward adapter and connected to the EPU by wiring.

12. The guidance kit of claim 11, wherein the EPU comprises a safety enable switch that permits selectively enabling and disabling the proximity sensor.

* * * * *